United States Patent
Wang et al.

(10) Patent No.: US 9,930,682 B2
(45) Date of Patent: Mar. 27, 2018

(54) METHOD AND APPARATUS FOR MANAGING COMMUNICATION INTERFACES IN A COMMUNICATION SYSTEM

(71) Applicant: AT&T INTELLECTUAL PROPERTY I, L.P., Atlanta, GA (US)

(72) Inventors: Jiansong Wang, Parlin, NJ (US); Ryan Redfern, Cerritos, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/445,384

(22) Filed: Feb. 28, 2017

(65) Prior Publication Data

US 2017/0171872 A1    Jun. 15, 2017

Related U.S. Application Data

(63) Continuation of application No. 15/161,910, filed on May 23, 2016, which is a continuation of application No. 14/064,526, filed on Oct. 28, 2013, now Pat. No. 9,374,230.

(51) Int. Cl.
| | |
|---|---|
| H04W 4/00 | (2009.01) |
| H04W 72/08 | (2009.01) |
| H04L 12/14 | (2006.01) |
| H04L 12/24 | (2006.01) |
| H04W 64/00 | (2009.01) |
| H04W 88/16 | (2009.01) |
| H04W 92/10 | (2009.01) |

(52) U.S. Cl.
CPC ....... *H04W 72/087* (2013.01); *H04L 12/1407* (2013.01); *H04L 41/0893* (2013.01); *H04W 64/00* (2013.01); *H04W 88/16* (2013.01); *H04W 92/10* (2013.01)

(58) Field of Classification Search
None
See application file for complete search history.

(56) References Cited

U.S. PATENT DOCUMENTS

| | | | |
|---|---|---|---|
| 9,374,230 | B2 | 6/2016 | Wang et al. |
| 9,622,254 | B2 * | 4/2017 | Wang ............. H04L 12/1407 |
| 2011/0075675 | A1 | 3/2011 | Koodli et al. |
| 2013/0102277 | A1 | 4/2013 | Stenfelt et al. |
| 2013/0107799 | A1 | 5/2013 | Karlsson et al. |

(Continued)

*Primary Examiner* — Willie J Daniel, Jr.
(74) *Attorney, Agent, or Firm* — Guntin & Gust, PLC; David Terrell

(57) ABSTRACT

A system that incorporates the subject disclosure may include, for example, facilitating establishing a first interface between a processor and the system where the system performs a policy and charging rules function in a mobile communications network and where the first interface bypasses a packet data network gateway and a serving gateway, facilitating establishing a second interface between the processor and the system where the second interface utilizes the packet data network gateway and the serving gateway, providing a first message from the processor to the system via the first interface where the first message is associated with a quality of service authorization, and receiving a second message from the system via the first interface where the second message is associated with the quality of service authorization. Other embodiments are disclosed.

20 Claims, 12 Drawing Sheets

(56) References Cited

U.S. PATENT DOCUMENTS

2013/0163424 A1 6/2013 Goerke et al.
2013/0163434 A1 6/2013 Hamel et al.
2016/0270097 A1 9/2016 Wang et al.

* cited by examiner

300

300

500

500

800

METHOD AND APPARATUS FOR MANAGING COMMUNICATION INTERFACES IN A COMMUNICATION SYSTEM

CROSS-REFERENCE TO RELATED APPLICATIONS

This application is a continuation of U.S. application Ser. No. 15/161,910, filed May 23, 2016 (now U.S. Patent Publication No. 2016/0270097), which is a continuation of U.S. application Ser. No. 14/064,526, filed Oct. 28, 2013 (now U.S. Pat. No. 9,374,230), which are incorporated herein by reference in their entirety.

FIELD OF THE DISCLOSURE

The subject disclosure relates to a method and apparatus for managing communication interfaces in a communication system.

BACKGROUND

Communication systems, such as mobile networks, try to utilize simple and efficient means for propagation of information to various devices. However, certain devices may not have the visibility of other devices, such as visibility of the actual mobility procedures and/or UE mobility states. Conflicts can arise which result in termination of communication sessions.

BRIEF DESCRIPTION OF THE DRAWINGS

Reference will now be made to the accompanying drawings, which are not necessarily drawn to scale, and wherein.

DETAILED DESCRIPTION

Figure 1:
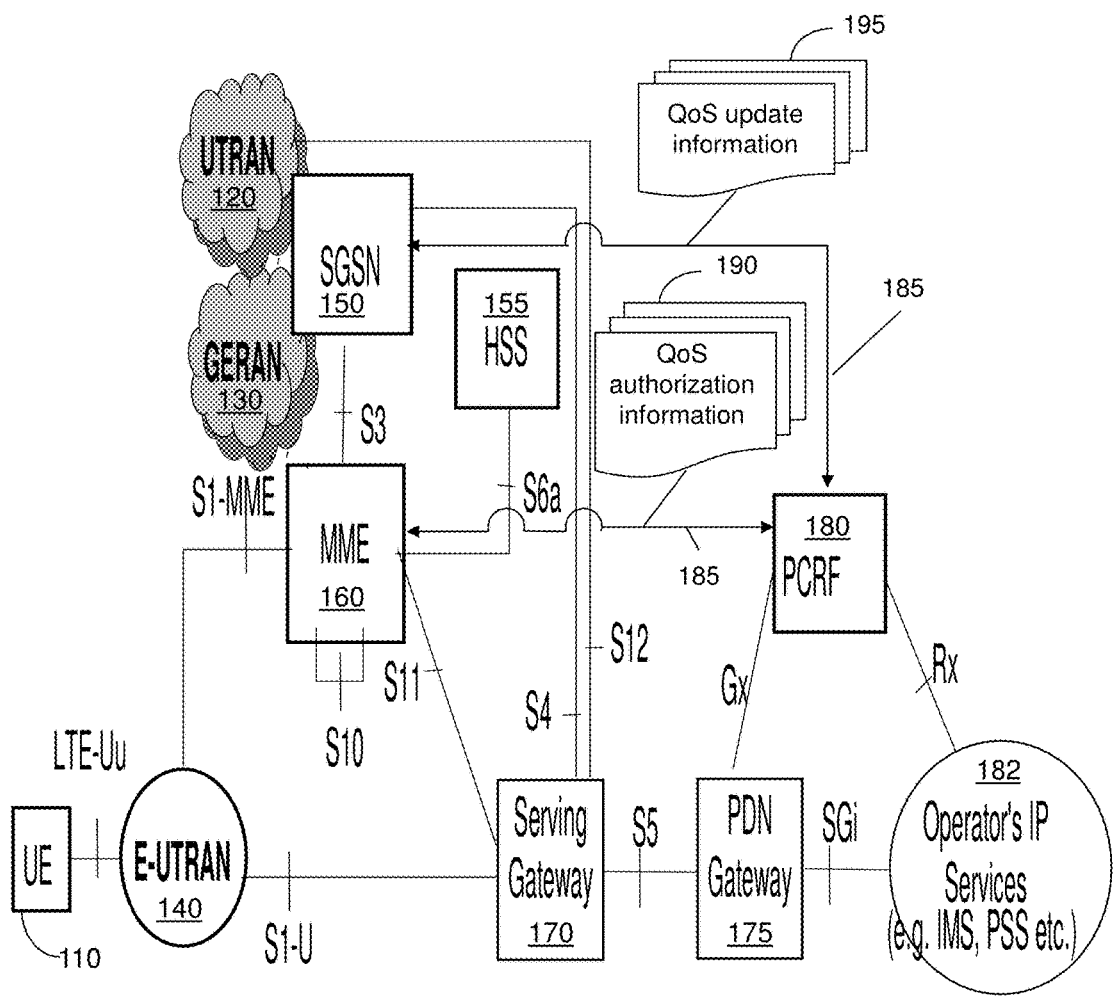
FIGS. 1 and 2 depict illustrative embodiments of systems for exchanging information by selectively utilizing different interfaces.

The subject disclosure describes, among other things, illustrative embodiments of a method and system for managing communications in a wireless network. An interface between a Policy and Charging Rules Function (PCRF) and one or both of a Mobility Management Entity (MME) and Serving General packet radio service Support Node (SGSN) can be established while maintaining an indirect interface between the PCRF and the MME/SGSN via a Serving Gateway (SGW) and a Packet Data Network Gateway (PGW). The different interfaces can be utilized for different types of traffic. For instance, the direct interface between the PCRF and the MME/SGSN can be utilized for Quality of Service (QoS) information, including QoS authorization requests and responses, as well as QoS authorization updates and acceptances. Other information associated with the QoS messaging can also utilize the direct interface, such as providing user location information, network congestion measurements or other performance characteristics, quality of service parameters, identification of radio access technology, international mobile subscriber identity, and so forth. The indirect interface that utilizes the SGW and PGW can be used for exchanging other types of information between the PCRF and the MME/SGSN such as create session requests. Other embodiments are included in the subject disclosure.

One embodiment of the subject disclosure is a method that includes facilitating, by a system including a processor, establishing a first interface between the system and a first server, where the system performs policy and charging rules function in a mobile communications network, where the first interface bypasses a Packet data network gateway and a serving gateway, and where the first server operates as one of a mobile management entity or a serving general packet radio service support node. The method can include providing a first message from the system to the first server via the first interface, where the first message is associated with a quality of service authorization. The method can include receiving, at the system, a second message from the first server via the first interface, wherein the second message is associated with the quality of service authorization.

One embodiment of the subject disclosure includes a computer-readable storage device comprising computer instructions which, responsive to being executed by a processor of a mobility management entity, cause the processor to perform operations comprising facilitating establishing a first interface between the processor and a system including another processor, where the system performs a policy and charging rules function in a mobile communications network, and where the first interface bypasses a packet data network gateway and a serving gateway. The processor can facilitate establishing a second interface between the processor and the system, wherein the second interface utilizes the packet data network gateway and the serving gateway. The processor can provide a first message from the processor to the system via the first interface, wherein the first message is associated with a quality of service authorization. The processor can receive a second message from the system via the first interface, where the second message is associated with the quality of service authorization.

One embodiment of the subject disclosure includes a device having a memory to store executable instructions, and a processor coupled to the memory. The processor, responsive to executing the executable instructions, performs operations comprising facilitating establishing a first interface between the processor and a system including another processor, where the system performs a policy and charging rules function in a mobile communications network, and where the first interface bypasses a packet data network gateway and a serving gateway. The processor can facilitate establishing a second interface between the processor and the system, where the second interface utilizes the packet data network gateway and the serving gateway. The processor can provide a first message from the processor to the system via the first interface, where the first message is associated with a quality of service authorization. The processor can receive a second message from the system via the first interface, where the second message is associated with the quality of service authorization, where the processor operates as a serving general packet radio service support node.

FIG. 1 depicts an illustrative embodiment of a system that can provide a direct interface between an MME/SGSN and PCRF, in addition to selectively utilizing a PCRF interface via the PCEF/PGW (e.g., indirect interface). The direct and indirect interfaces can perform different functions such as based on the types of information being exchanged. In one embodiment, the direct interface between the PCRF and the MME/SGSN can be used for communicating network initiated QoS update procedures during the mobility procedures and/or for communicating information associated with UE-initiated session management procedures. The MME/SGSN can operate as a central control point for managing mobility procedures, processing UE-initiated session management procedures and arbitrating session/bearer QoS settings among the QoS information from the old serving core node, and the QoS information from HSS/HLR subscriptions and the QoS information from SGSN/MME local policy (especially in inbound roaming cases). In one or more embodiments, the MME/SGSN can evaluate the PCRF Bearer/Session QoS Control Requests directly with respect to other available QoS Control Request information so that the MME/SGSN can deal with QoS updates/downgrades for user bearers/session in a cohesive and coordinated manner.

In FIG. 1, a mobile communication system 100 is illustrated that can provide communication services, including voice, video and/or data services to mobile devices, such as end user device 110. System 100 can enable communication services over a number of different networks, such as between end user device 110 and another communication device (e.g., a second end user device) not shown. End user device 110 can be a number of different types of devices that are capable of voice, video and/or data communications, including a mobile device (e.g., a smartphone), a personal computer, a set top box, a multi-mode communication device and so forth.

System 100 can include one or more of a Universal Terrestrial Radio Access Network (UTRAN) 120, a Global System for Mobile communications (GSM) Enhanced Data rates for GSM Evolution (EDGE) Radio Access Network 130 (herein referred to as GERAN 130), and an E-UTRAN 140. The system 100 can further include one or more of a SGSN 150, and an MME 160. Other components not shown can also be utilized for providing communication services to the UE 110, such as a Mobile Switching Center (MSC) which can facilitate routing voice calls and Short-Message Service (SMS), as well as other services (e.g., conference calls, FAX and circuit switched data) via setting up and releasing end-to-end connections, handling mobility and hand-over requirements during the communications, and/or performing charging and real time pre-paid account monitoring.

In one or more embodiments, system 100 can provide for circuit switched fallback for packet switching so as to enable the provisioning of voice and other circuit switched-domain services (e.g., circuit switched UDI video/LCS/USSD) by reuse of circuit switched infrastructure, such as when the end-user device 110 is served by E-UTRAN 140. In one or more embodiments, a circuit-switched fallback enabled terminal (e.g., UE 110) connected to E-UTRAN 140 may use GERAN 130 or UTRAN 120 to connect to the circuit switched-domain. In one or more embodiments, the circuit switched fallback and Internet Protocol Multimedia Subsystem (IMS)-based services of system 100 can co-exist in a single service operator's network 182.

In one or more embodiments, UTRAN 120 can include node B's and radio network controllers which enable carrying many traffic types including real-time circuit-switched to IP-based packet switched traffic. The UTRAN 120 can also enable connectivity between the end user device 110 and the core network. The UTRAN 120 can utilize a number of interfaces including Iu, Uu, Iub and/or Iur. In one or more embodiments, GERAN 130 can facilitate communications between base stations (e.g., Ater and Abis interfaces) and base station controllers (e.g., A interfaces).

In one or more embodiments, E-UTRAN 140 can be the air interface for the LTE upgrade path for mobile networks according to the 3GPP specification. E-UTRAN 140 can include enodeBs on the network that are connected to each other such as via an X2 interface, which are connectable to the packet switch core network via an S1 interface. For example, E-UTRAN 140 can use various communication techniques including orthogonal frequency-division multiplexing (OFDM), multiple-input multiple-output (MIMO) antenna technology depending on the capabilities of the terminal, and beamforming for downlink to support more users, higher data rates and lower processing power required on each handset.

In one or more embodiments, the SGSN 150 can assume responsibility for delivery of data packets from and to mobile stations within the SGSN's geographical service or coverage area. The SGSN 150 can perform functions including packet routing and transfer, mobility management (e.g., attach/detach and location management), logical link management, and/or authentication and charging functions. In one or more embodiments, a location register of the SGSN 150 can store location information (e.g., current cell) and user profiles (e.g., addresses used in the packet data network) of users registered with the SGSN. In one or more embodiments, the SGSN 150 can de-tunnel GTP packets from a GGSN (downlink), tunnel IP packets toward the GGSN (uplink), carry out mobility management as a standby mode mobile device moves between routing areas, and process or facilitate billing of user data. In other embodiments, the SGSN 150 can perform functions associated with Enhanced Data Rates for GSM Evolution (EDGE). For instance, the SGSN 150 can connect via frame relay or IP to the packet control unit using the Gb protocol stack, accept uplink data to form IP packets, encrypt down-link data, decrypt up-link data, and carry out mobility management to the level of a cell for connected mode mobiles. In one or more embodiments, the SGSN 150 can tunnel/de-tunnel downlink/uplink packets toward the RNC and carry out mobility management to the level of an RNC for connected mode mobiles.

In one or more embodiments, a Home Subscriber Server (HSS) 155 can be provided that is a central database that contains user-related and subscription-related information. The functions of the HSS 155 include functionalities such as mobility management, call and session establishment support, user authentication and access authorization. In one embodiment, the HSS 155 can manage subscription-related information in real time, for multi-access and multi-domain offerings in an all-IP environment. The HSS 155 can be based on Home Location Register (HLR) and Authentication Center (AuC).

In one or more embodiments, MME 160 can perform the function of a control-node, such as for an LTE access network. For example, the MME 160 can perform functions such as idle mode UE tracking and paging procedures including retransmissions. The MME 160 can handle, participate in or otherwise facilitate the bearer activation/ deactivation process. The MME 160 can also choose a serving gateway (e.g., SGW 170) for the end user device 110 such as at the initial attach and at time of intra-LTE handover involving node (e.g., core network) relocation. The MME 160 can perform user authentication, such as via interaction with the HSS 155. Non Access Stratum signaling can terminate at the MME 160. In one or more embodiments, identities (e.g., temporary) can be processed, such as generated and allocated, by the MME 160 for UE's. The MME 160 can process (e.g., verifying authorization) camping by a UE on a service providers PLMN and can enforce UE roaming restrictions.

In one or more embodiments, the MME 160 can provide control plane function for mobility between LTE and 2G/3G access networks via an S3 interface terminating at the MME from the SGSN as shown in FIG. 1. The MME 160 can terminate an S6a interface towards the HSS 155 for roaming UEs as also shown in FIG. 1. In one embodiment, the MME 160 can be a termination point in a network for ciphering/integrity protection for NAS signaling and can handle security key management. Lawful interception of signaling can also be supported by or otherwise facilitated by the MME 160.

In one or more embodiments, the SGW 170 can route and forward user data packets, while also acting as the mobility anchor for the user plane during inter-eNodeB handovers and as the anchor for mobility between LTE and other 3GPP technologies (e.g., terminating S4 interface and relaying the traffic between 2G/3G systems and PGW). For idle state UEs, the SGW 170 can terminate the downlink data path and can trigger paging when downlink data arrives for the UE. The SGW 170 can manage and can store UE contexts, e.g. parameters of the IP bearer service, network internal routing information.

In one or more embodiments, the PGW 175 can provide connectivity from the UE 110 to external packet data networks by being the point of exit and entry of traffic for the UE. A UE 110 can have simultaneous connectivity with more than one PGW 175 for accessing multiple PDNs. The PGW 175 can perform policy enforcement, packet filtering for each user, charging support, lawful interception and/or packet screening. The PGW 175 can also act as the anchor for mobility between 3GPP and non-3GPP technologies such as WiMAX and 3GPP2 (CDMA 1× and EvDO).

In one or more embodiments, a PCRF 180 can be provided. For example, the PCRF 180 can be a software node designated in real-time to determine policy rules. As a policy tool, the PCRF 180 can operate at the network core and can access subscriber databases and other specialized functions, such as a charging system, in a centralized manner. The PCRF 180 can aggregate information to and from the network, operational support systems, and other sources (such as portals) in real time, supporting the creation of rules and then automatically making policy decisions for each subscriber active on the network. The PCRF 180 can provide a network agnostic solution (e.g., wire line and/or wireless) and can be integrated with different platforms like billing, rating, charging, and subscriber database or can also be deployed as a standalone entity. The functions performed by the PCRF 180 can be any variety of functions, such as computer implemented steps in a process or algorithm associated with operation of a mobile communications network. As an example, the PCRF 180 can aggregate information in a hosting network and can make policy decisions for each subscriber active in the network automatically. Operational support systems (OSS) can support the creation of rules which can assist in policy making. The PCRF 180 can operate according to a received session and media related information through an application function. Subscriber information databases and other specialized functions can be made accessible to the PCRF 180.

A direct interface 185 between the PCRF 180 and one or both of the SGSN 150 and MME 160 can be established, such as via a diameter protocol. In this embodiment, a direct interface can be an interface that utilizes various network elements to establish a route of communication between the PCRF 180 and one or both of the SGSN 150 and MME 160 without utilizing the SGW 170 and PGW 175 in the route of the direct interface. An indirect interface between PCRF 180 and one or both of the SGSN 150 and MME 160 via PGW 175 and SGW 170, can also be maintained. In one or more embodiments, information can be exchanged between the PCRF 180 and the SGSN 150 and/or MME 160 where the interfaces are selectively utilized based on a type of information. For example, the direct interface 185 can be used for exchanging QoS messages, such as QoS authorization information 190 (e.g., QoS Authorization Requests and QoS Authorization Responses) and/or QoS update information 195 (e.g., QoS Authorization Updates and QoS Authorization Update Acceptances). Other information associated with QoS messages can also be exchanged via direct interface 185, such as user location information, a type of radio access technology being utilized, and so forth. Continuing with this example, other types of information can be exchanged using the indirect interface (e.g., via PGW 175 and SGW 170), such as create session requests.

Figure 2:
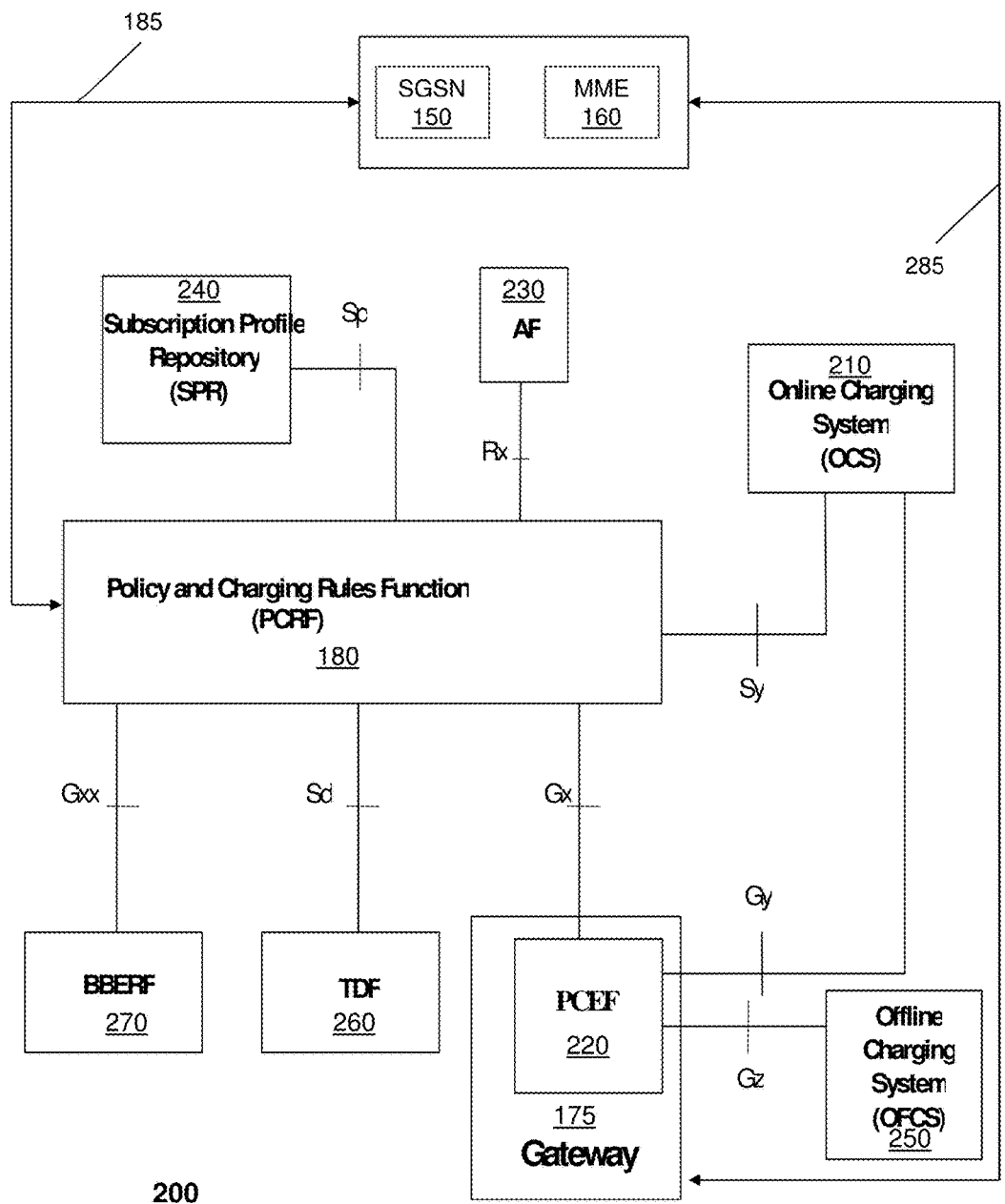

FIG. 2 depicts an illustrative embodiment of a communication system 200 that can be coupled with all or a portion of system 100. System 200 can perform PCC functions, such as via Diameter network elements, for implementing, enforcing and controlling charging and policy. As an example, in one embodiment, the Diameter network elements and/or the implemented functions can be those that are part of the 3GPP Policy and Charging Control architecture defined in 3GPP TS 23.203 and the Charging Architecture defined in 3GPP TS 32.240, the disclosures of which are hereby incorporated by reference. System 200 can support either or both of an internal and external Online Charging System (OCS) 210 and can include an online business logic function (not shown) to mediate IMS level online charging. System 200 can utilize real-time session management and QoS, which involve the synchronization and simultaneous use of charging and policy control, to intertwine these functions and their corresponding network elements.

System 200 can include PCRF 180, a Policy and Charging Enforcement Function (PCEF) 220, the Application Function (AF) or application servers 230 which can be a Proxy CSCF (P-CSCF), a Subscriber Profile Repository (SPR) 240, the OCS 210, an Offline Charging System (OFCS) 250 which can be implemented by a Charging Data Function (CDF) and Charging Gateway Function (CGF), the Application Function or Server (AS), a Media Resource Controller Function (MRFC), a Traffic Detection Function (TDF) 260, and a Gateway Function (GWF) from the S-CSCF. In one embodiment, system 200 can map policy control network elements (e.g., PCRF 180, SPR 240, OCS 210) and/or charging network elements (e.g., OCS 210, AF 230) together on a per user and/or per session basis. In one embodiment, the system 200 can create a binding per user session between the PCRF 180 and various network elements and also between the OCS 210 and various network elements.

The PCRF 180 can encompass policy control decision and flow based charging control functionalities. The PCRF 180 can provide network control regarding the service data flow detection, gating, QoS and flow based charging (except credit management) towards the PCEF 220. The PCRF 180 can authorize QoS resources. The PCRF 180 can use the service information received from the AF 230 (e.g. SDP information or other available application information) and/or the subscription information received from the SPR 240 to calculate the proper QoS authorization (QoS class identifier, bitrates). The PCRF 180 can also take into account the requested QoS received from the PCEF 220 via Gx interface.

The PCEF 220 can encompass service data flow detection, policy enforcement and flow based charging functionalities. This functional entity can be located at the Gateway (e.g. GGSN in the GPRS case, and PDG in the WLAN case). The PCEF 220 can provide service data flow detection, user plane traffic handling, triggering control plane session management (where the IP-CAN permits), QoS handling, and service data flow measurement as well as online and offline charging interactions. The PCEF 220 can select an appropriate Policy and Charging Control (PCC) rule for the evaluation process of received packets against the service data flow filters of PCC rules.

Other network nodes, such as eUTRAN 140, MME 160, SGW 170 can be connected to the PCEF 220 via SGW, as shown in FIG. 1. The AF 230 can offer applications that require dynamic policy and/or charging control over the IP-CAN user plane behavior. The AF 230 can communicate with the PCRF 180 to transfer dynamic session information, required for PCRF decisions as well as to receive IP-CAN specific information and notifications about IP-CAN bearer level events. An AF 230 can be the IMS network (which has many functional nodes), or the application servers connected to IMS network, as shown in FIG. 1 as Operator's IP Services 182. One example of an AF 230 is the VoLTE Server, which handles Voice over LTE and other multimedia services. The signaling control for VoLTE can be handled by the IMS network.

The SPR 240 can contain all subscriber/subscription related information needed for subscription-based policies and IP-CAN bearer level PCC rules by the PCRF 180. The OCS 210 can perform online credit control functions such as specified in 3GPP TS 32.240, the disclosure of which is hereby incorporated by reference. The OCS can trigger the PCEF 220 to initiate an IP-CAN bearer service termination at any point in time. The OFCS 250 can function as billing servers. The Bearer Binding and Event Reporting Function (BBERF) 270 can perform functionalities including Bearer binding, Uplink bearer binding verification, Event reporting to the PCRF 180, Sending or receiving IP-CAN-specific parameters, to or from the PCRF. The Traffic Detection Function (TDF) 260 can perform application detection and reporting of detected application and its service data flow description to the PCRF.

System 200 can utilize the direct interface 185 between the PCRF 180 and one or both of the SGSN 150 and MME 160. System 200 can also utilize an indirect interface 285 between PCRF 180 and one or both of the SGSN 150 and MME 160 via PGW 175 and a SGW (not shown).

System 200 can provide interface 185 based on the Diameter protocol, although other protocols could be utilized. In one embodiment, a new Diameter Application ID can be assigned for interface 185. In one embodiment, a transport layer for the interface 185 can use a Stream Control Transmission Protocol (SCTP), although other protocols could be used. In one embodiment, interface 185 can reuse existing defined AVPs on the S6a interface and on the Gx interface. In one embodiment, the interface 185 can be limited to Bearer/Session QoS control, such as UE-AMBRs, APN-AMBRs per PDN Connection, QCI per EPS bearer, and/or ARP/PCI/PVI per bearer. In one embodiment, when the MME/SGSN queries the PCRF 180, it can indicate the user location information and RAT type to the PCRF.

In one embodiment, during a UE Attach Procedure, the MME 160 can receive or otherwise obtain QoS parameters from the PCRF 180 directly through the interface 185, in addition to the QoS requested by the UE and the QoS downloaded from HSS subscription. In one embodiment, for home users, the QoS parameters provided by the PCRF 180 can prevail. In this example, the MME 160 can use the QoS parameters provided by the PCRF 180 to create a PDN session, to set up the proper RAB QoS and to provide the UE with the proper QoS directly.

In one embodiment, during the IRAT TAU or PSHO procedure from an old Gn-SGSN to a new MME 160, once the new MME gets SGSN Context from the old Gn-SGSN, the new MME can query the PCRF 180 first through interface 185 to obtain the bearer QoS parameters from the PCRF for all active APNs and for the UE. In this example, the new MME 160 can use the PCRF provided QoS parameters to create or otherwise facilitate the establishment of the session on the SGW/PGW and can establish access bearers with the eNB and UE.

In one embodiment, during the IRAT TAU or PSHO procedure from an old S4-SGSN to a new MME 160, once the new MME gets UE Context from the old S4-SGSN, the new MME can query the PCRF 180 first through interface 185 to get the bearer QoS parameters from the PCRF for all active APNs and for the UE. In this example, the new MME 160 can use the PCRF provided QoS parameters to modify the session to the SGW/PGW accordingly and establish access bearers with the eNB and UE.

In one or more embodiments, the MME local QoS policies can prevail in all the cases for incoming roamers. In this example, a serving MME 160 may not query the PCRF 180 for incoming roamers.

In one embodiment, during a PDP Activation Procedure, the S4-SGSN 150 can receive or otherwise obtain QoS parameters from the PCRF 180 directly through the interface 185, in addition to the QoS requested by the UE and the QoS downloaded from HSS/HLR subscription. In one embodiment, for home users, the PCRF provided QoS parameters can prevail. In this example, the S4-SGSN 150 can use the QoS parameters provided by the PCRF 180 to create or otherwise facilitate the establishment of a PDN session, to set up the proper RAB QoS and to provide the UE proper QoS directly.

In one embodiment, during the inter-SGSN RAU or PSHO procedure from an old Gn-SGSN to a new S4-SGSN 150, once the new S4-SGSN gets SGSN Context from the old Gn-SGSN, the new S4-SGSN can query the PCRF 180 first through the interface 185 to get the bearer QoS parameters from the PCRF for all active APNs and for the UE. In this example, the new S4-SGSN 150 can use the PCRF provided QoS parameters to create or otherwise facilitate the establishment of the session on the SGW/PGW and establish access bearers with RNC and UE.

In one embodiment, during the IRAT RAU or PSHO procedure from an old MME to a new S4-SGSN 150, once the new S4-SGSN gets UE Context from the old MME, the new S4-SGSN can query the PCRF 180 first through interface 185 to obtain or otherwise receive the bearer QoS parameters from the PCRF for all active APNs and for the UE. In this example, the new S4-SGSN 150 can use the PCRF provided QoS parameters to modify the session to the SGW/PGW accordingly and can establish access bearers with the RNC and UE.

In one or more embodiments, the S4-SGSN local QoS policies can prevail in all the cases for incoming roamers. In this example, the serving S4-SGSN 150 may not query the PCRF 180 for incoming roamers. In another embodiment, for Gn-SGSNs that have legacy SGSN interfaces and no diameter stacks, the interface 185 would not be utilized for these Gn-SGSNs.

In one embodiment, for Update QoS procedure in UMTS, the PCRF 180 can directly contact the S4-SGSN 150 to update the session/bearer QoS. The S4-SGSN 150 can use a Modify PDP Context procedure to modify the QoS in UE, use the modify RAB procedure to modify the QoS in RAN, and can use the Modify Bearer Request/Response procedure to modify the QoS in S/PGW. In this example, the Modify Bearer Request message can be enhanced to support S4-SGSN Initiated QoS modification, instead of using a Modify Bearer Command which would trigger an unnecessary additional Update Bearer procedure from the PGW. With the enhancement of the Modify Bearer Request message according to the exemplary embodiments, the QoS modification can be more straightforward and consistent in the EPC core.

In one embodiment, for Update QoS procedure in LTE, the PCRF 180 can directly contact the MME 160 via the interface 185 to update the session/bearer QoS. The MME 160 can use the Modify EPS Bearer procedure to modify the QoS in UE, use the modify ERAB procedure to modify the QoS in eUTRAN and can use the Modify Bearer Request/Response procedure to modify the QoS in S/PGW. In this example, the Modify Bearer Request message can be enhanced to support MME initiated QoS modification, instead of using Modify Bearer Command which would trigger an unnecessary additional Update Bearer procedure from the PGW. With the enhancement of the Modify Bearer Request message according to the exemplary embodiments, the QoS modification can be more straightforward and consistent in the EPC core.

Figure 3:
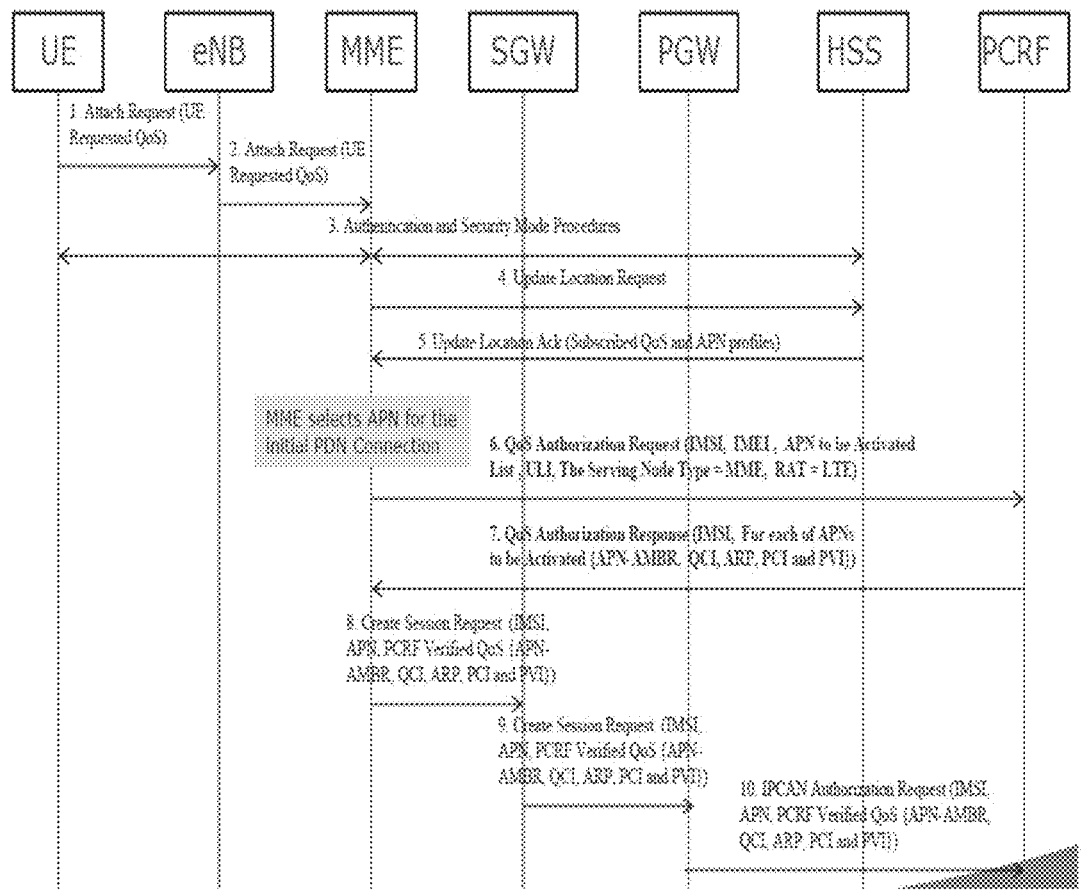
FIGS. 3-8 depict illustrative embodiments of call flow charts utilizing a direct interface between the MME/SGSN and PCRF.
Figure 4:
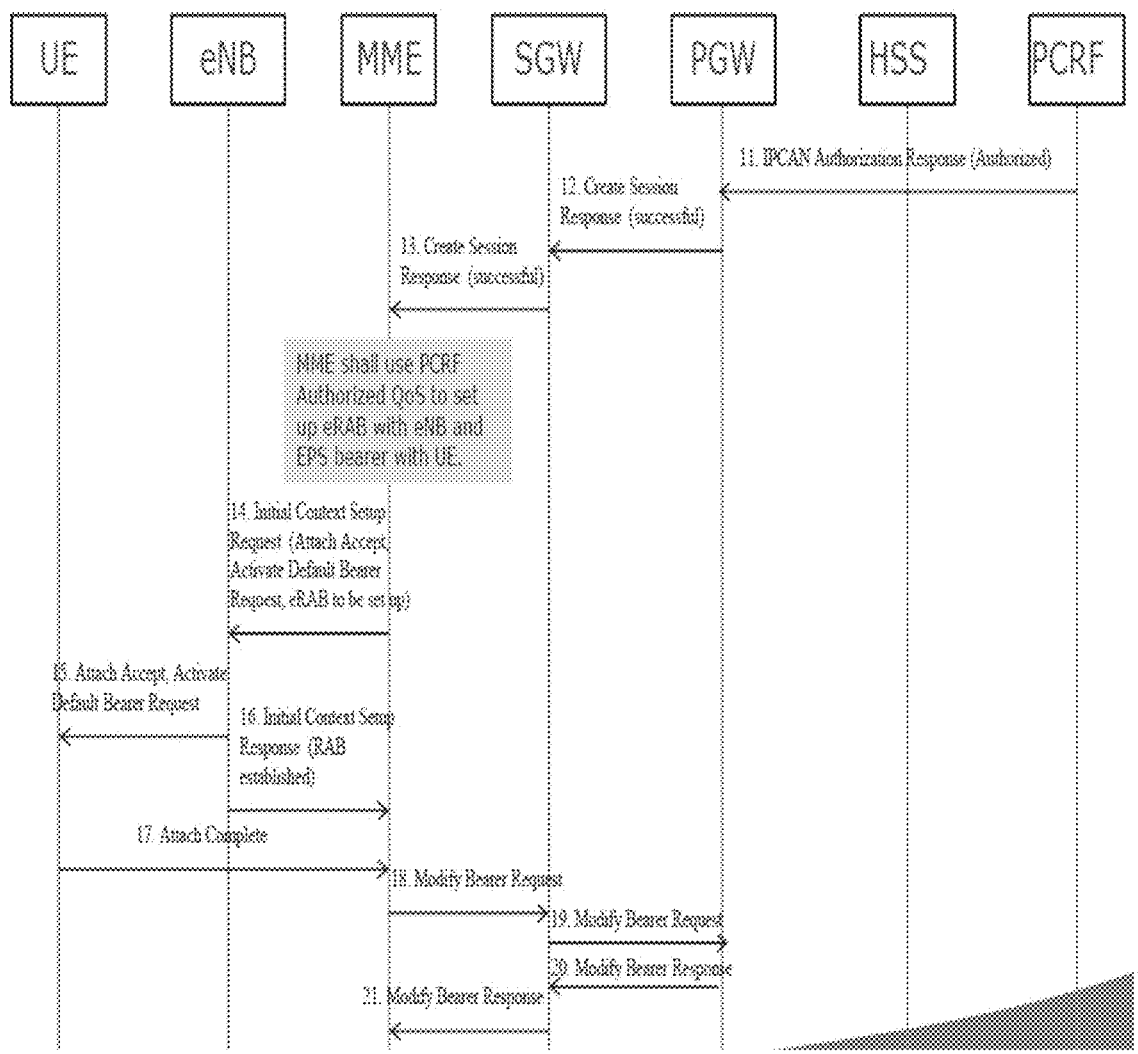

Referring to FIGS. 3-4, a call flow diagram 300 is illustrated depicting the process that utilizes a direct interface between the MME and the PCRF, as well as an indirect interface that can include the SGW and PGW in the routing path. Call flow 300 is an Attach Call Flow that can utilize some features of the Attach Call Flow in Section 5.3.2 of TS 23.401, the disclosure of which is hereby incorporated by reference. In call flow 300 before the MME creates a session with the S/PGW, the MME directly (via interface 185) queries the PCRF for QoS authorization on APNs to be activated (such as for home users only) in Step 6. In Step 7, the PCRF can directly respond via interface 185 with Authorized QoS for the APNs to be activated. In this embodiment after Step 7, the MME can use the PCRF Authorized QoS to create a session with S/PGW, establish eRAB with eNB and set up EPS Bearer with the UE. In Step 10, during the session creation flow, the PCRF can receive an IPCAN request from the PGW/PCEF (via the indirect interface 285). Since the QoS Authorization is already done earlier in the steps 6 and 7, the PCRF may only need to verify accounting and other non-direct QoS related policies.

The IRAT TAU Call Flow from Gn-SGSN to MME can utilize some features of the call flow in Section D.3.6 of TS 23.401, the disclosure of which is hereby incorporated by reference. In this embodiment, the MME can query the PCRF for QoS Authorization on all active APNs received from the Gn-SGSN after the step 7 and before the step 9. Once the PCRF gives the proper QoS parameters for each APN active in LTE, the MME can use the PCRF authorized QoS parameters for the subsequent procedures to create session with S/PGW, establish eRAB with eNB and set up EPS Bearer with UE.

The IRAT PSHO Call Flow from Gn-SGSN to MME can utilize some features of the call flow in Section D.3.4 of TS 23.401, the disclosure of which is hereby incorporated by reference. In this embodiment, the MME can query the PCRF for QoS Authorization on all active APNs received from the Gn-SGSN after the step 3 and before the step 4. Once the PCRF gives the proper QoS parameters for each APN active in LTE, the MME can use the PCRF authorized QoS parameters for the subsequent procedures to create session with S/PGW, establish eRAB with eNB and set up EPS Bearer with UE. In one embodiment, in the MME QoS Authorization Request to the PCRF, the MME can include the IMSI, IMEI if available, the APNs to be activated, User Location Information (ULI), the serving node type (e.g., MME) and/or the current Radio Access Technology (RAT) type (e.g., LTE).

The IRAT TAU without SGW change Call Flow from S4-SGSN to MME can utilize some features of the call flow in Section 5.3.3.2 of TS 23.401, the disclosure of which is hereby incorporated by reference. In this embodiment, the MME can query the PCRF for QoS Authorization on all active APNs received from the S4-SGSN after the step 7 and before the step 9. Once the PCRF gives the proper QoS parameters for each APN active in LTE, the MME can use the PCRF authorized QoS parameters for the subsequent procedures to modify session with S/PGW, establish eRAB with eNB and set up EPS Bearer with UE.

The IRAT TAU with SGW change Call Flow from S4-SGSN to MME can utilize some features of the call flow in Section 5.3.3.1 of TS 23.401, the disclosure of which is hereby incorporated by reference. In this embodiment, the MME can query the PCRF for QoS Authorization on all active APNs received from the S4-SGSN after the step 7 and before the step 8. Once the PCRF gives the proper QoS parameters for each APN active in LTE, the MME can use the PCRF authorized QoS parameters for the subsequent procedures to create session with S/PGW, establish eRAB with eNB and set up EPS Bearer with UE.

The IRAT PSHO Call Flow without SGW change from S4-SGSN to MME can utilize some features of the call flow in Section 5.5.2.2.2 of TS 23.401, the disclosure of which is hereby incorporated by reference. In this embodiment, the MME can query the PCRF for QoS Authorization on all active APNs received from the S4-SGSN after the step 3 and before the step 5. Once the PCRF gives the proper QoS parameters for each APN active in LTE, the MME can use the PCRF authorized QoS parameters for the subsequent procedures to modify session with S/PGW, establish eRAB with eNB and set up EPS Bearer with UE.

The IRAT PSHO Call Flow with SGW change from S4-SGSN to MME can utilize some features of the call flow in Section 5.5.2.2.2 of TS 23.401. In this embodiment, the MME can query the PCRF for QoS Authorization on all active APNs received from the S4-SGSN after the step 3 and before the step 4. Once the PCRF gives the proper QoS parameters for each APN active in LTE, the MME can use the PCRF authorized QoS parameters for the subsequent procedures to create session with S/PGW, establish eRAB with eNB and set up EPS Bearer with UE. In one embodiment, in the MME QoS Authorization Request to the PCRF, the MME can include the IMSI, IMEI if available, the APNs to be activated, ULI, the Serving Node Type (e.g., MME) and/or the current RAT type (e.g., LTE).

Figure 5:
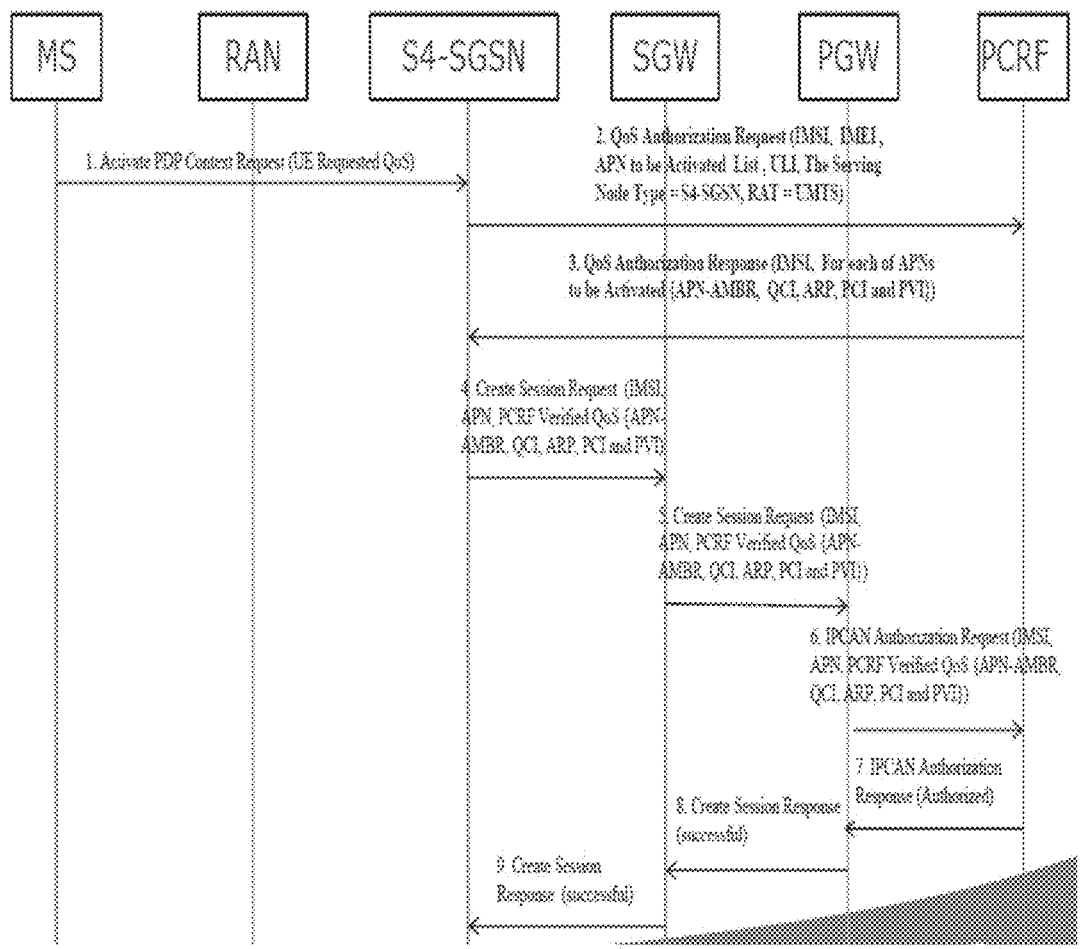
Figure 6:
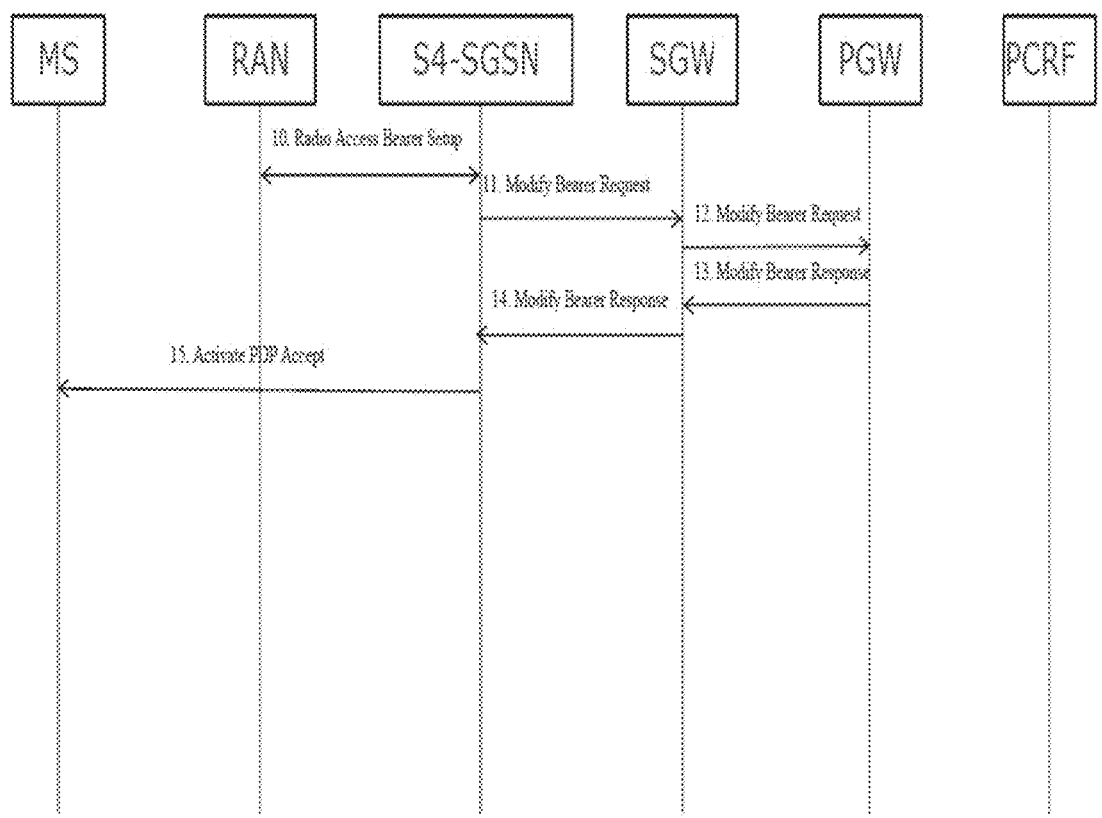

Referring to FIGS. 5-6, a call flow diagram 500 is illustrated depicting the process that utilizes a direct interface between the SGSN and the PCRF, as well as an indirect interface that includes the SGW and PGW in the routing path. Call flow 500 is a PDP Activation Call Flow that can utilize some features of the PDP Activation Call Flow in FIG. 64 of Section 9.2.2.1 of TS 23.060, the disclosure of which is hereby incorporated by reference. In this embodiment, before the S4-SGSN creates session with the S/PGW, the S4-SGSN can directly query (via the interface 185) the PCRF for QoS authorization on APNs to be Activated (e.g., for home users only) in step 2. In step 3, the PCRF can respond via the interface 185 with Authorized QoS for the APNs to be Activated. After step 3, the S4-SGSN can use the PCRF Authorized QoS to create a session with S/PGW, establish RAB with RAN and set up PDP Context Session with the UE. In Step 6, during the session creation flow, the PCRF can receive the IPCAN request from the PGW/PCEF via the indirect interface 285. Since the QoS Authorization is already done earlier in the steps 2 and 3, the PCRF may only verify accounting and other non-direct QoS related Policies.

The Inter-SGSN RAU Call Flow from Gn-SGSN to S4-SGSN can utilize some features of the call flow in Section 6.9.2 of TS 23.060, the disclosure of which is hereby incorporated by reference. In this embodiment, the S4-SGSN can query the PCRF for QoS Authorization on all active APNs received from the Gn-SGSN after the step 5 and before the step 9. Once the PCRF gives the proper QoS parameters for each APN active in LTE, the S4-SGSN can use the PCRF authorized QoS parameters for the subsequent procedures to create session with S/PGW, establish RAB with RAN and set up PDP Context Session with UE.

The Inter-SGSN PSHO Call Flow from Gn-SGSN to S4-SGSN can utilize some features of the call flow in Section 6.9.2.2.1 of TS 23.060, the disclosure of which is hereby incorporated by reference. In this embodiment, the S4-SGSN can query the PCRF for QoS Authorization on all active APNs received from the Gn-SGSN after the step 3 and before the step 4. Once the PCRF gives the proper QoS parameters for each APN active in LTE, the S4-SGSN can use the PCRF authorized QoS parameters for the subsequent procedures to create session with S/PGW, establish RAB with RAN and set up PDP Context Session with UE. In one embodiment, in the S4-SGSN QoS Authorization Request to the PCRF, the S4-SGSN can include the IMSI, IMEI if available, the APNs to be activated, ULI, the Serving Node Type (e.g., S4-SGSN) and/or the current RAT type (e.g., UMTS).

The IRAT RAU without SGW change Call Flow from MME to S4-SGSN can utilize some features of the call flow in Section 5.3.3.3 of TS 23.401, the disclosure of which is hereby incorporated by reference. In this embodiment, the S4-SGSN can query the PCRF for QoS Authorization on all active APNs received from the MME after the step 6 and before the step 7. Once the PCRF gives the proper QoS parameters for each APN active in UMTS, the S4-SGSN can use the PCRF authorized QoS parameters for the subsequent procedures to modify session with S/PGW, establish RAB with RAN and set up PDP Context Session with the UE.

The IRAT RAU with SGW change Call Flow from MME to S4-SGSN can utilize some features of the call flow in Section 5.3.3.6 of TS 23.401, the disclosure of which is hereby incorporated by reference. In this embodiment, the S4-SGSN can query the PCRF for QoS Authorization on all active APNs received from the MME after the step 6 and before the step 7. Once the PCRF gives the proper QoS parameters for each APN active in UMTS, the S4-SGSN can use the PCRF authorized QoS parameters for the subsequent procedures to create session with S/PGW, establish RAB with RAN and set up PDP Context Session with UE.

The IRAT PSHO Call Flow without SGW change from MME to S4-SGSN can utilize some features of the call flow in Section 5.5.2.1.2 of TS 23.401, the disclosure of which is hereby incorporated by reference. In this embodiment, the S4-SGSN can query the PCRF for QoS Authorization on all active APNs received from the MME after the step 3 and before the step 5. Once the PCRF gives the proper QoS parameters for each APN active in UMTS, the S4-SGSN can use the PCRF authorized QoS parameters for the subsequent procedures to modify session with S/PGW, establish RAB with RAN and set up PDP Context Session with UE.

The IRAT PSHO Call Flow with SGW change from MME to S4-SGSN can utilize some features of the call flow in Section 5.5.2.1.2 of TS 23.401. The S4-SGSN can query the PCRF for QoS Authorization on all active APNs received from the MME after the step 3 and before the step 4. Once the PCRF gives the proper QoS parameters for each APN active in LTE, the S4-SGSN can use the PCRF authorized QoS parameters for the subsequent procedures to create session with S/PGW, establish RAB with RAN and set up PDP Context Session with UE. In one embodiment, in the S4-SGSN QoS Authorization Request to the PCRF, the S4-SGSN can include the IMSI, IMEI if available, the APNs to be activated, ULI, the Serving Node Type (e.g., S4-SGSN) and/or the current RAT type (e.g., UMTS).

Figure 7:
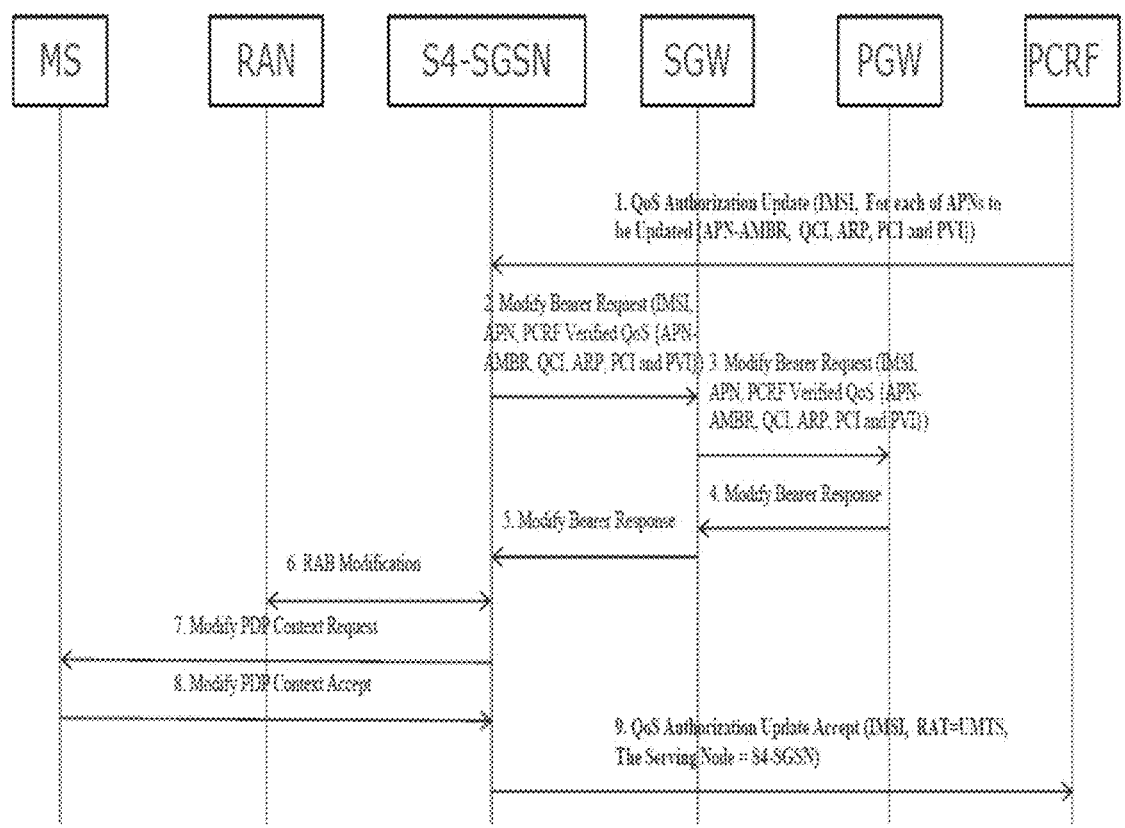

Referring to FIG. 7, a call flow diagram 700 is illustrated depicting the process that utilizes a direct interface between the SGSN and the PCRF for updating QoS. At 1, the PCRF can decide to update the UE/Bearer QoS such as due to usage policy and/or geographical location policy change. The PCRF can send a QoS Authorization Update to the S4-SGSN such as including IMSI and QoS parameters for each updated APN. At 2, the S4-SGSN can send a Modify Bearer Request to the SGW such as including IMSI and QoS parameters for each updated APN and can indicate that the QoS parameters are PCRF verified. At 3, the SGW can send the Modify Bearer Request to the PGW. At 4, the PGW can acknowledge the QoS change. At 5, the SGW can acknowledge the QoS change. At 6, the S4-SGSN can modify the RAB, based on the new QoS parameters. At 7, the S4-SGSN can send a Modify PDP Context Request to the UE. At 8, the UE can acknowledge the QoS change by a Modify PDP Context Accept. At 9, once the S4-SGSN completes the QoS modifications on S/PGW, with the UTRAN and with the UE, the S4-SGSN can acknowledge the PCRF by sending a QoS Authorization Update Ack such as including IMIS, RAT=UMTS and The Serving Node Type=S4-SGSN.

Figure 8:
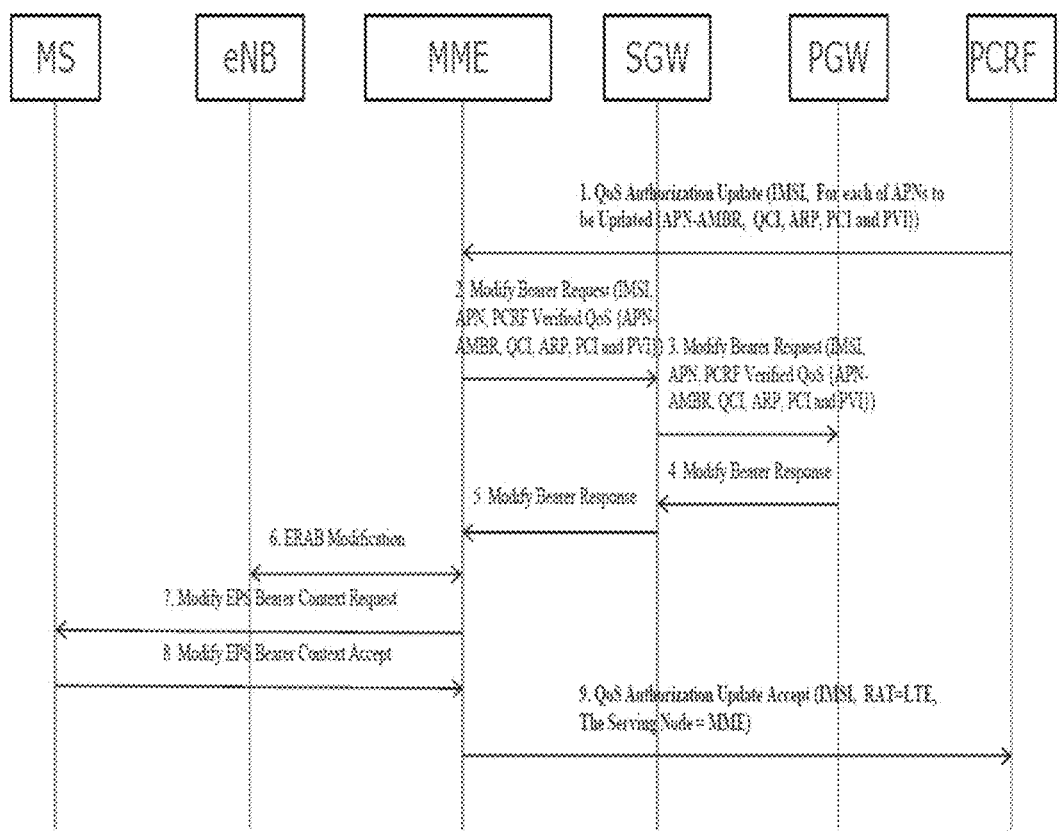

Referring to FIG. 8, a call flow diagram 800 is illustrated depicting the process that utilizes a direct interface between the MME and the PCRF for updating QoS. At 1, the PCRF can decide to update the UE/Bearer QoS such as due to usage policy and/or geographical location policy change. The PCRF can send a QoS Authorization Update to MME such as including IMSI and QoS parameters for each updated APN. At 2, the MME can send a Modify Bearer Request to the SGW with IMSI and QoS parameters for each updated APN and can indicate that the QoS parameters are PCRF verified. At 3, the SGW can send the Modify Bearer Request to the PGW. At 4, the PGW can acknowledge the QoS change. At 5, the SGW can acknowledges the QoS change. At 6, the MME can modify the ERAB, based on the new QoS parameters. At 7, the MME can send a Modify EPS Bearer Context Request to UE. At 8, the UE can acknowledge the QoS change by a Modify EPS Bearer Context Accept. At 9, once the MME completes the QoS modifications on S/PGW, with the UTRAN and with the UE, the S4-SGSN can acknowledge the PCRF by sending a QoS Authorization Update Ack such as including IMIS, RAT=LTE and The Serving Node Type=MME.

Figure 9:
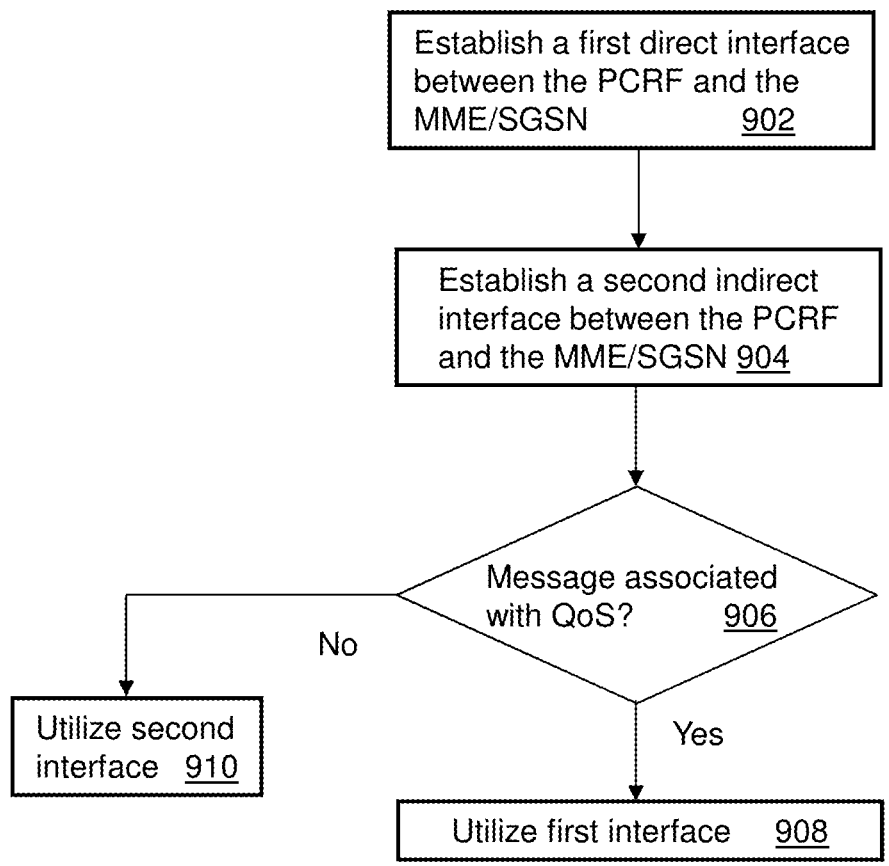
FIG. 9 depicts an illustrative embodiment of a method for exchanging information by selectively utilizing different interfaces.

FIG. 9 depicts an illustrative embodiment of a method 900 for managing communication interfaces in a communication system, such as a wireless network. Method 900 can include steps, or a portion thereof, which are performed by one or more devices of FIGS. 1-2. Method 900 can also incorporate one or more steps from the call flows of FIGS. 3-8. Method 900 can be performed by a single device or a combination of devices. Method 900 can begin at 902 where a first interface is established between the PCRF 180 and one or both of the SSGN 150 and MME 160. This first interface can be a direct interface, such as being established without utilizing the PGW, PCEF, and/or SGW in the routing path. The first interface can be established using various intermediary elements and/or various interfacing techniques. In one embodiment, the first interface can utilize a diameter protocol, can employ a transport layer utilizing SCTP protocol, and can be assigned a first diameter application ID.

At 904, a second interface can be established between the PCRF 180 and one or both of the SSGN 150 and MME 160. This second interface can be an indirect interface, such as utilizing the PGW, PCEF, and/or SGW in the routing path. In one embodiment, this second interface can be part of a more general interface that enables the PCRF to communicate certain information in a single procedure flow to the PCEF, PGW, SGW, MME, eUTRAN and/or UE. The second interface can be established using various intermediary elements and/or various interfacing techniques. In one embodiment, the second interface can utilize a diameter protocol, can employ a transport layer utilizing SCTP protocol, and can be assigned a second diameter application ID (that is different from the first diameter application ID).

At 906, a determination can be made as to whether a message should utilize the first interface or the second interface such as based on a first type of message or a second type of message. In one embodiment, the determination can be made based on the type of message corresponding to the subject matter of the message. For instance, the determinative subject matter can be quality of service (e.g., a QoS Authorization Request, QoS Authorization Response, QoS Authorization Update, or QoS Authorization Update Accept). In one embodiment, the first interface can be limited to the bearer/session QoS control only, e.g., UE-AMBRs, APN-AMBRs per PDN Connection, QCI per EPS bearer, ARP/PCI/PVI per bearer, and so forth. In other embodiments, the determination as to which interface to utilize can be based on other criteria, such as measured or predicted network load, interface availability, identification of UEs, types of communication sessions, and so forth. At 908, if a message being exchanged between the PCRF and one or both of the SGSN and MME is of the first type then it utilizes the first interface which bypasses the PCEF, PGW and SGW. At 910, if a message being exchanged between the PCRF and one or both of the SGSN and MME is of the second type then it utilizes the second interface which includes routing via the PCEF, PGW and/or SGW. These message exchanges can be in either direction, e.g., received by the PCRF or provided by the PCRF.

Figure 10:
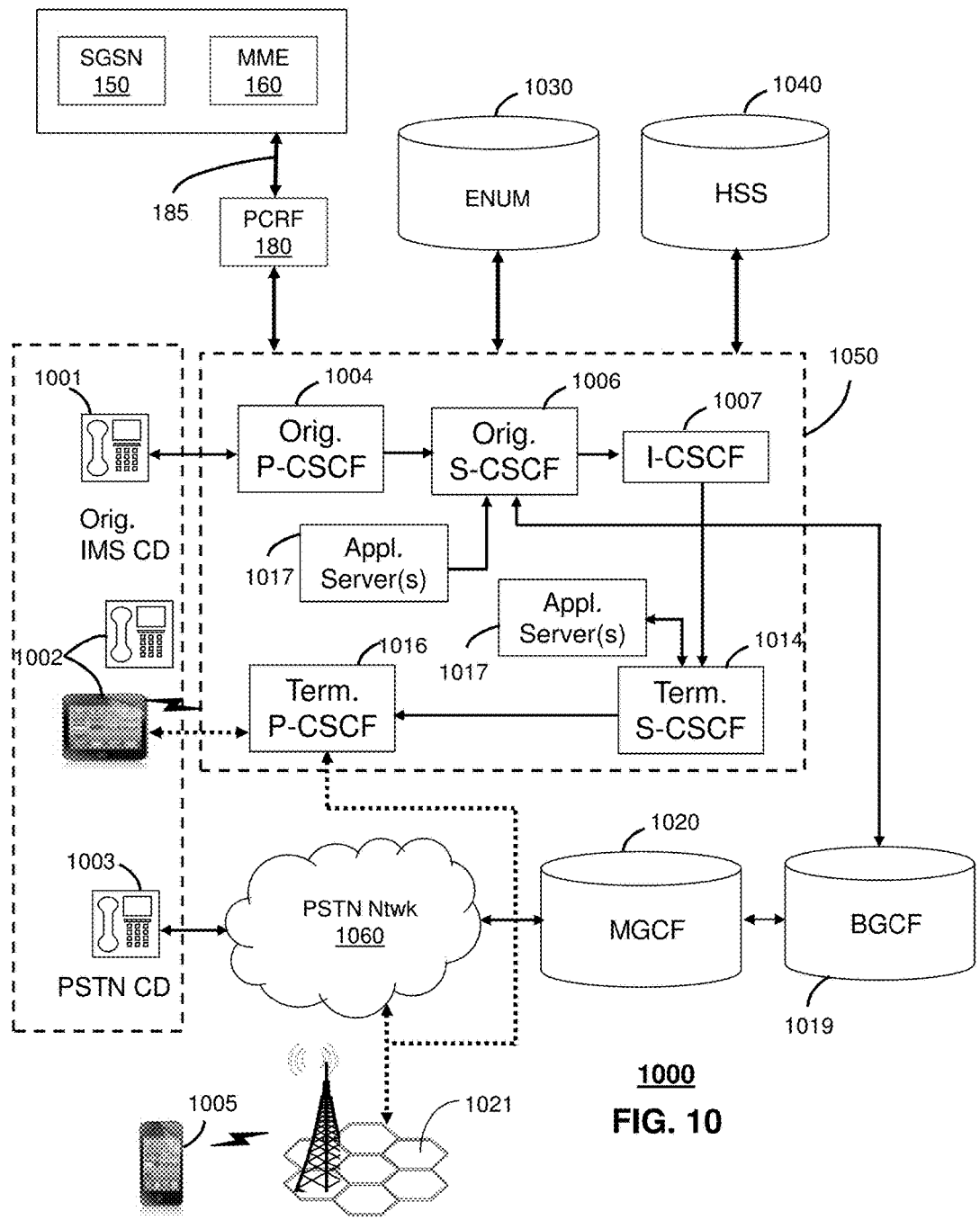
FIG. 10 depicts an illustrative embodiment of another system for exchanging information by selectively utilizing different interfaces.

FIG. 10 depicts an illustrative embodiment of a communication system 1000 employing an IP Multimedia Subsystem (IMS) network architecture to facilitate the combined services of circuit-switched and packet-switched systems.

Communication system 1000 can be overlaid or operably coupled with systems 100 and/or 200 of FIGS. 1 and 2 as another representative embodiment of communication system 1000. System 1000 can be used with method 900 for exchanging information between the PCRF 180 and one or both of the SGSN 150 and MME 160 by selectively utilizing the direct interface 185 (which bypasses the PCEF, PGW and SGW) or an indirect interface which includes the PCEF, PGW and/or SGW in the routing path. The different interfaces can be utilized for different types of traffic. For instance, the direct interface 185 between the PCRF 180 and the MME/SGSN can be utilized for QoS information, including QoS authorization requests and responses, as well as QoS authorization updates and acceptances. Other information associated with the QoS messaging can also utilize the direct interface 185, such as providing user location information, network congestion measurements or other performance characteristics, quality of service parameters, identification of radio access technology, international mobile subscriber identity, and so forth. In one embodiment, the indirect interface that utilizes the SGW and PGW can be used for exchanging other types of information between the PCRF and the MME/SGSN, such as create session requests.

In one embodiment, the direct interface 185 between the PCRF 180 and the MME/SGSN can be used for communicating network initiated QoS update procedures during the mobility procedures and/or for communicating information associated with UE-initiated session management procedures. In one or more embodiments, the MME/SGSN can evaluate the PCRF Bearer/Session QoS Control Requests directly via the interface 185 with respect to other available QoS Control Request information so that the MME/SGSN can deal with QoS updates/downgrades for user bearers/session.

Communication system 1000 can comprise a Home Subscriber Server (HSS) 1040, a tElephone NUmber Mapping (ENUM) server 1030, and other network elements of an IMS network 1050. The HSS 1040 can store various subscription information received from various sources, such as from the PCRF 180 and/or PCEF 220 of FIG. 2.

The IMS network 1050 can establish communications between IMS-compliant communication devices (CDs) 1001, 1002, Public Switched Telephone Network (PSTN) CDs 1003, 1005, and combinations thereof by way of a Media Gateway Control Function (MGCF) 1020 coupled to a PSTN network 1060. The MGCF 1020 need not be used when a communication session involves IMS CD to IMS CD communications. A communication session involving at least one PSTN CD may utilize the MGCF 1020.

IMS CDs 1001, 1002 can register with the IMS network 1050 by contacting a Proxy Call Session Control Function (P-CSCF) which communicates with an interrogating CSCF (I-CSCF), which in turn, communicates with a Serving CSCF (S-CSCF) to register the CDs with the HSS 1040. To initiate a communication session between CDs, an originating IMS CD 1001 can submit a Session Initiation Protocol (SIP INVITE) message to an originating P-CSCF 1004 which communicates with a corresponding originating S-CSCF 1006.

The originating S-CSCF 1006 can submit the SIP INVITE message to one or more application servers 1017 that can provide a variety of services to IMS subscribers. For example, the application servers 1017 can be used for various functions including billing and/or network performance analysis. In one embodiment, the application servers 1017 can be used to perform originating call feature treatment functions on the calling party number received by the originating S-CSCF 1006 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 1006 can submit queries to the ENUM system 1030 to translate an E.164 telephone number in the SIP INVITE message to a SIP Uniform Resource Identifier (URI) if the terminating communication device is IMS-compliant. The SIP URI can be used by an Interrogating CSCF (I-CSCF) 1007 to submit a query to the HSS 1040 to identify a terminating S-CSCF 1014 associated with a terminating IMS CD such as reference 1002. Once identified, the I-CSCF 1007 can submit the SIP INVITE message to the terminating S-CSCF 1014. The terminating S-CSCF 1014 can then identify a terminating P-CSCF 1016 associated with the terminating CD 1002. The P-CSCF 1016 may then signal the CD 1002 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 10 may be interchangeable. It is further noted that communication system 1000 can be adapted to support video conferencing. In addition, communication system 1000 can be adapted to provide the IMS CDs 1001, 1002 with multimedia and Internet services.

If the terminating communication device is instead a PSTN CD such as CD 1003 or CD 1005 (in instances where the cellular phone only supports circuit-switched voice communications), the ENUM system 1030 can respond with an unsuccessful address resolution which can cause the originating S-CSCF 1006 to forward the call to the MGCF 1020 via a Breakout Gateway Control Function (BGCF) 1019. The MGCF 1020 can then initiate the call to the terminating PSTN CD over the PSTN network 1060 to enable the calling and called parties to engage in voice and/or data communications.

It is further appreciated that the CDs of FIG. 10 can operate as wireline or wireless devices. For example, the CDs of FIG. 10 can be communicatively coupled to a cellular base station 1021, a femtocell, a WiFi router, a Digital Enhanced Cordless Telecommunications (DECT) base unit, or another suitable wireless access unit to establish communications with the IMS network 1050 of FIG. 10. The cellular access base station 1021 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 10.

Cellular phones supporting LTE can support packet-switched voice and packet-switched data communications and thus may operate as IMS-compliant mobile devices. In this embodiment, the cellular base station 1021 may communicate directly with the IMS network 1050 as shown by the arrow connecting the cellular base station 1021 and the P-CSCF 1016.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 11:
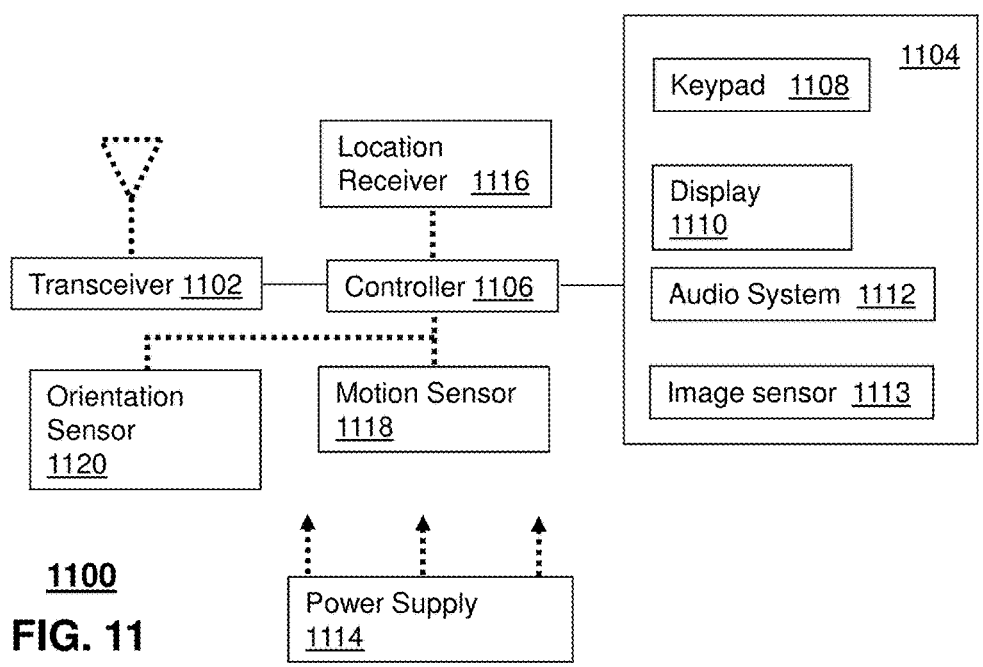
FIG. 11 depicts an illustrative embodiment of a communication device that can be used in exchanging information by selectively utilizing different interfaces.

FIG. 11 depicts an illustrative embodiment of a communication device 1100. Communication device 1100 can serve in whole or in part as an illustrative embodiment of the devices depicted in FIGS. 1-8 and 10, including PCRF devices, MME devices, SGSN devices, SGW devices, PGW devices, PCEF devices, UEs, and so forth. As an example, device 1100 can facilitate establishing a first interface between itself a first server, where the device performs policy and charging rules function in a mobile communications network, where the first interface bypasses a public data network gateway and a serving gateway, and where the first server operates as one of a mobile management entity or a serving general packet radio service support node. The device 1100 can provide a first message from itself to the first server via the first interface, where the first message is associated with a quality of service authorization. The device 1100 can receive a second message from the first server via the first interface, where the second message is associated with the quality of service authorization. The device 1100 can also facilitate establishing a second interface with the first server where the second interface is an indirect interface that utilizes a PCEF, PGW and/or SGW in the routing path.

To enable selective utilization of different interfaces, such as interface 185 and interface 285 of FIGS. 1 and 2, communication device 1100 can comprise various components such as one or more of a wireline and/or wireless transceiver 1102 (herein transceiver 1102), a user interface (UI) 1104, a power supply 1114, a location receiver 1116, a motion sensor 1118, an orientation sensor 1120, and a controller 1106 for managing operations thereof. The transceiver 1102 can support short-range or long-range wireless access technologies such as Bluetooth, ZigBee, WiFi, DECT, or cellular communication technologies, just to mention a few. Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1102 can also be adapted to support circuit-switched wireline access technologies (such as PSTN), packet-switched wireline access technologies (such as TCP/IP, VoIP, etc.), and combinations thereof.

The UI 1104 can include a depressible or touch-sensitive keypad 1108 with a navigation mechanism such as a roller ball, a joystick, a mouse, or a navigation disk for manipulating operations of the communication device 1100. The keypad 1108 can be an integral part of a housing assembly of the communication device 1100 or an independent device operably coupled thereto by a tethered wireline interface (such as a USB cable) or a wireless interface supporting for example Bluetooth. The keypad 1108 can represent a numeric keypad commonly used by phones, and/or a QWERTY keypad with alphanumeric keys. The UI 1104 can further include a display 1110 such as monochrome or color LCD (Liquid Crystal Display), OLED (Organic Light Emitting Diode) or other suitable display technology for conveying images to an end user of the communication device 1100. In an embodiment where the display 1110 is touch-sensitive, a portion or all of the keypad 1108 can be presented by way of the display 1110 with navigation features.

The display 1110 can use touch screen technology to also serve as a user interface for detecting user input. As a touch screen display, the communication device 1100 can be adapted to present a user interface with graphical user interface (GUI) elements that can be selected by a user with a touch of a finger. The touch screen display 1110 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1110 can be an integral part of the housing assembly of the communication device 1100 or an independent device communicatively coupled thereto by a tethered wireline interface (such as a cable) or a wireless interface.

The UI 1104 can also include an audio system 1112 that utilizes audio technology for conveying low volume audio (such as audio heard in proximity of a human ear) and high volume audio (such as speakerphone for hands free operation). The audio system 1112 can further include a microphone for receiving audible signals of an end user. The audio system 1112 can also be used for voice recognition applications. The UI 1104 can further include an image sensor 1113 such as a charged coupled device (CCD) camera for capturing still or moving images.

The power supply 1114 can utilize common power management technologies such as replaceable and rechargeable batteries, supply regulation technologies, and/or charging system technologies for supplying energy to the components of the communication device 1100 to facilitate long-range or short-range portable applications. Alternatively, or in combination, the charging system can utilize external power sources such as DC power supplied over a physical interface such as a USB port or other suitable tethering technologies.

The location receiver 1116 can utilize location technology such as a global positioning system (GPS) receiver capable of assisted GPS for identifying a location of the communication device 1100 based on signals generated by a constellation of GPS satellites, which can be used for facilitating location services such as navigation. The motion sensor 1118 can utilize motion sensing technology such as an accelerometer, a gyroscope, or other suitable motion sensing technology to detect motion of the communication device 1100 in three-dimensional space. The orientation sensor 1120 can utilize orientation sensing technology such as a magnetometer to detect the orientation of the communication device 1100 (north, south, west, and east, as well as combined orientations in degrees, minutes, or other suitable orientation metrics).

The communication device 1100 can use the transceiver 1102 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 1106 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1100.

Other components not shown in FIG. 11 can be used in one or more embodiments of the subject disclosure. For instance, the communication device 1100 can include a reset button (not shown). The reset button can be used to reset the controller 1106 of the communication device 1100. In yet another embodiment, the communication device 1100 can also include a factory default setting button positioned, for example, below a small hole in a housing assembly of the communication device 1100 to force the communication device 1100 to re-establish factory settings. In this embodiment, a user can use a protruding object such as a pen or paper clip tip to reach into the hole and depress the default setting button. The communication device 1100 can also include a slot for adding or removing an identity module such as a Subscriber Identity Module (SIM) card. SIM cards can be used for identifying subscriber services, executing programs, storing subscriber data, and so forth.

The communication device 1100 as described herein can operate with more or less of the circuit components shown in FIG. 11. These variant embodiments can be used in one or more embodiments of the subject disclosure.

The communication device 1100 shown in FIG. 11 or portions thereof can serve as a representation of one or more of the devices of systems 100, 200, 1000 and/or devices involved in the call flows and method of FIGS. 3-10.

Upon reviewing the aforementioned embodiments, it would be evident to an artisan with ordinary skill in the art that said embodiments can be modified, reduced, or enhanced without departing from the scope of the claims described below. For example, the types of communication that utilize interface 185 rather than interface 285 can be adjusted. For instance, interface 185 can initially be used for QoS Authorization Requests and Responses and then subsequently can be used for QoS Authorization Updates and Acceptances. The adjustment of types of messages utilizing the interface 185 rather than the interface 285 can be based on a number of factors, including network load, predicted network load, detected failure in the network, types of communication sessions, and so forth. In another embodiment, the utilization of the first and second interface 185, 285 does not need to be exclusive. For example, the PCRF can send the same message along both interfaces. In another embodiment, the types of messages that utilize the indirect interface 285 can be transitioned over to the direct interface 185 over time.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/ or wired paths that utilize one or more of various protocols or methodologies, where the coupling and/or connection can be direct (e.g., no intervening processing device) and/or indirect (e.g., an intermediary processing device such as a router).

Figure 12:
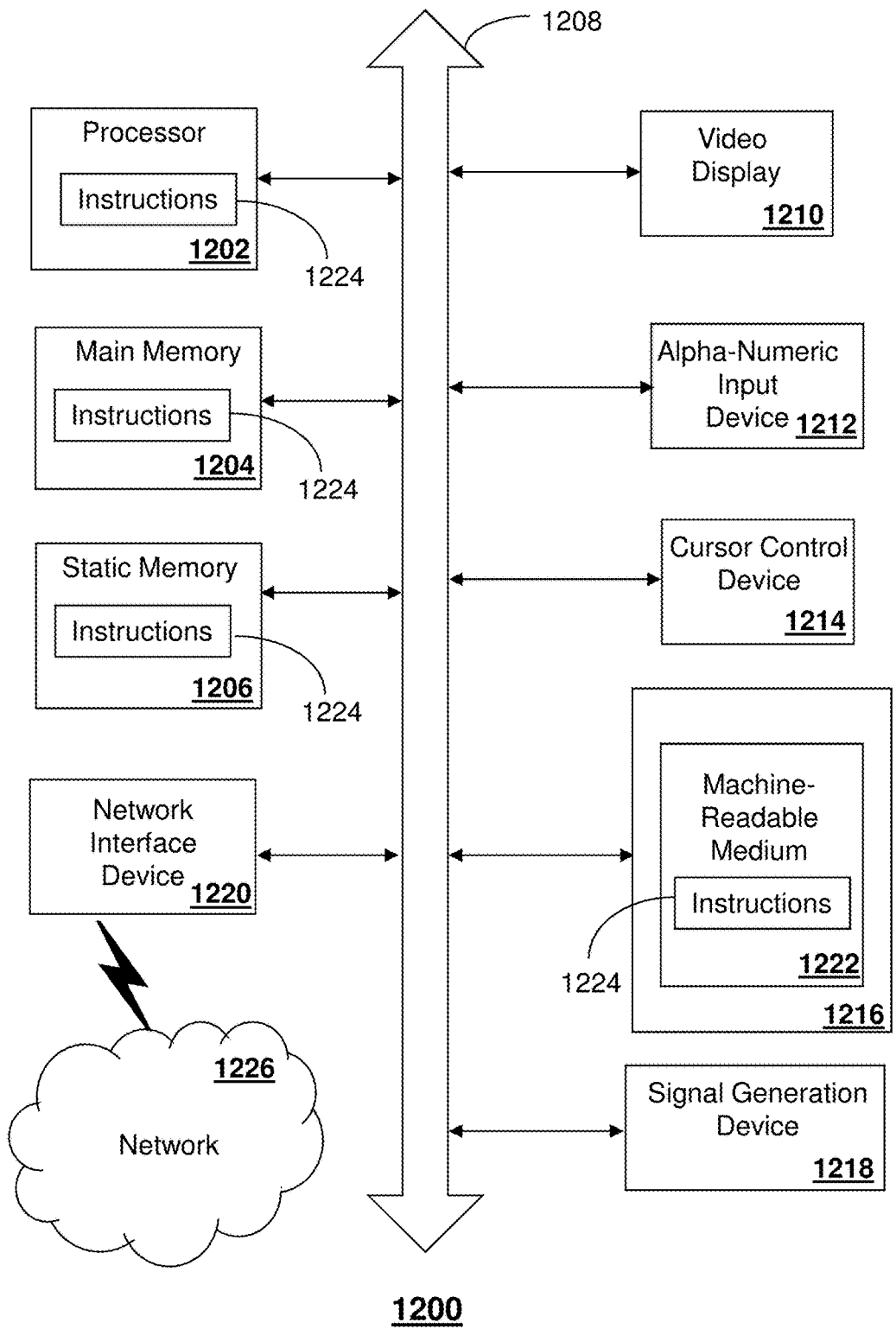
FIG. 12 is a diagrammatic representation of a machine in the form of a computer system within which a set of instructions, when executed, may cause the machine to perform any one or more of the methods described herein.

FIG. 12 depicts an exemplary diagrammatic representation of a machine in the form of a computer system 1200 within which a set of instructions, when executed, may cause the machine to perform any one or more of the methods described above. One or more instances of the machine can operate, for example, as a PCC (e.g., the PCRF 180 and/or the PCEF 220), an MME, an SGSN, a PGW, a SGW, a UE and other devices of FIGS. 1-8 and 10-11 to enable selective use of a direct interface (e.g., interface 185) or an indirect interface (e.g., interface 285). For example, the machine can facilitate establishing a first interface between a processor and a system, where the system performs a policy and charging rules function in a mobile communications network, and where the first interface bypasses a public data network gateway and a serving gateway. The machine can facilitate establishing a second interface between the processor and the system, where the second interface utilizes the public data network gateway and the serving gateway. The machine can provide a first message from the processor to the system via the first interface, where the first message is associated with a quality of service authorization. The machine can receive a second message from the system via the first interface, where the second message is associated with the quality of service authorization, and where the machine operates as one or both of a mobility management entity and a serving general packet radio service support node.

In some embodiments, the machine may be connected (e.g., using a network 1226) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1200 may include a processor (or controller) 1202 (e.g., a central processing unit (CPU), a graphics processing unit (GPU, or both), a main memory 1204 and a static memory 1206, which communicate with each other via a bus 1208. The computer system 1200 may further include a display unit 1210 (e.g., a liquid crystal display (LCD), a flat panel, or a solid state display. The computer system 1200 may include an input device 1212 (e.g., a keyboard), a cursor control device 1214 (e.g., a mouse), a disk drive unit 1216, a signal generation device 1218 (e.g., a speaker or remote control) and a network interface device 1220. In distributed environments, the embodiments described in the subject disclosure can be adapted to utilize multiple display units 1210 controlled by two or more computer systems 1200. In this configuration, presentations described by the subject disclosure may in part be shown in a first of the display units 1210, while the remaining portion is presented in a second of the display units 1210.

The disk drive unit 1216 may include a tangible computer-readable storage medium 1222 on which is stored one or more sets of instructions (e.g., software 1224) embodying any one or more of the methods or functions described herein, including those methods illustrated above. The instructions 1224 may also reside, completely or at least partially, within the main memory 1204, the static memory 1206, and/or within the processor 1202 during execution thereof by the computer system 1200. The main memory 1204 and the processor 1202 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1222 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 1200.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

The exemplary embodiments described herein can be part of various communication systems including an Internet Protocol Television (IPTV) media system satellite and/or terrestrial communication systems. These systems can provide various services including voice video and/or data services. Multiple forms of media services can be offered to media devices (e.g., mobile communication devices, set top boxes, desk top computers, and so forth) over landline technologies. Additionally, media services can be offered to media devices by way of wireless technologies such as through use of a wireless access base station operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described). Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more steps or functions, where the facilitating (e.g., facilitating access or facilitating establishing a connection) can include less than all of the steps needed to perform the function or can include all of the steps of the function.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:

receiving via a first interface, by a processing system including a processor, a first message in first communications from a network device, wherein the first interface is between the processing system and the network device, wherein the network device performs a policy rule function, wherein the first communications between the processing system and the network device via the first interface do not utilize any packet data network gateway or any serving gateway, and wherein the processing system operates as a mobility management entity or a serving general packet radio service support node;

receiving via a second interface, by the processing system, a second message in second communications from the network device, wherein the second interface is distinct from the first interface, wherein the second interface is between the processing system and the network device, and wherein the second communications between the processing system and the network device via the second interface do utilize a packet data network gateway or a serving gateway;

wherein the first message is sent by the network device via the first interface and not the second interface responsive to the network device identifying a first type of content in the first message; and wherein the second message is sent by the network device via the second interface and not the first interface responsive to the network device identifying a second type of content in the second message.

2. The method of claim 1, wherein the receiving the first message from the network device via the first interface is further based on network conditions and the receiving the second message from the network device is further based on network conditions.

3. The method of claim 1, wherein the receiving the first message from the network device via the first interface is further based on identifying the first message as a first message type and the receiving the second message from the network device is further based on identifying the second message as a second message type.

4. The method of claim 1, wherein the receiving the first message from the network device via the first interface is further based on a policy change.

5. The method of claim 4, wherein the policy change is one of a usage policy change or a geographical location policy change and wherein the network device further performs a charging rule function.

6. The method of claim 1, wherein the first message includes a quality of service authorization update, and wherein the second message includes a quality of service authorization update acceptance.

7. The method of claim 1, wherein the first message includes a quality of service authorization response, and wherein the second message includes a quality of service authorization request.

8. The method of claim 7, wherein the quality of service authorization request includes user location information associated with an end user device and an identification of radio access technology being utilized by the end user device.

9. The method of claim 1, wherein the first interface is limited to providing messages for quality of service control.

10. The method of claim 1, wherein the first message includes quality of service parameters associated with an end user attach procedure.

11. The method of claim 1, wherein the second message includes a request for bearer quality of service parameters for all active access point names and for an end user device.

12. The method of claim 1, wherein the first message includes quality of service parameters associated with a packet data protocol activation procedure.

13. A non-transitory computer-readable medium comprising computer instructions which, responsive to being executed by a processing system including a processor, cause the processing system to perform operations, the operations comprising:

obtaining first communications via a first interface between a network device and the processing system that operates as a mobility management entity or a serving general packet radio service support node, wherein the network device performs a policy rule function, wherein the first communications between the processing system and the network device via the first interface do not utilize any packet data network gateway or any serving gateway;

obtaining second communications via a second interface between the network device and the processing system, the second interface being distinct from the first interface, wherein the second communications between the processing system and the network device via the second interface do utilize a packet data network gateway or a serving gateway;

obtaining a first message from the network device via the first interface, wherein the network device sends the first message to the first interface and not the second interface responsive to the network device identifying the first message as a first message type; and obtaining a second message from the network device via the second interface, wherein the network device sends the second message to the second interface and not the first interface responsive to the network device identifying the second message as a second message type.

14. The non-transitory computer-readable medium of claim 13, wherein the obtaining the first message from the network device via the first interface is further based on network conditions and the obtaining the second message from the network device is further based on network conditions.

15. The non-transitory computer-readable medium of claim 13, wherein the first message includes a quality of service authorization update acceptance, and wherein the second message includes a quality of service authorization update.

16. The non-transitory computer-readable medium of claim 13, wherein the first message includes a quality of service authorization request, and wherein the second message includes a quality of service authorization response.

17. The non-transitory computer-readable medium of claim 13, wherein the first interface is limited to receiving messages for quality of service control.

18. A device comprising:

a processing system including a processor; and a memory that stores executable instructions that, when executed by the processing system, cause the processing system to operate as a mobility management entity or a serving general packet radio service support node by performing operations, the operations comprising:

obtaining a first communication via a first interface between the processing system and a network device, wherein the network device performs a policy rule function, wherein the first communication between the processing system and the network device via the first interface does not utilize any packet data network gateway or any serving gateway;

obtaining a second communication via a second interface between the processing system and the network device, the second interface being distinct from the first interface, wherein the second communication between the processing system and the network device via the second interface does utilize a packet data network gateway or a serving gateway;

obtaining a first signal from the network device via the first interface, wherein the network device sends the first signal to the first interface and not the second interface responsive to the network device identifying the first signal as a first signal type; and obtaining a second signal from the network device via the second interface, wherein the network device sends the second signal to the second interface and not the first interface responsive to the network device identifying the second signal as a second signal type.

19. The device of claim 18, wherein the obtaining the first signal from the network device via the first interface is further based on network conditions and the obtaining the second signal from the network device is further based on network conditions.

20. The device of claim 18, wherein the first interface is limited to receiving messages for quality of service control.

* * * * *